Figure 9:
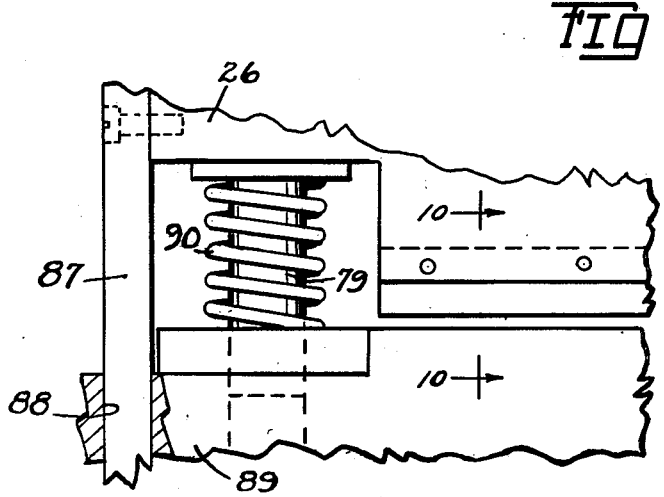

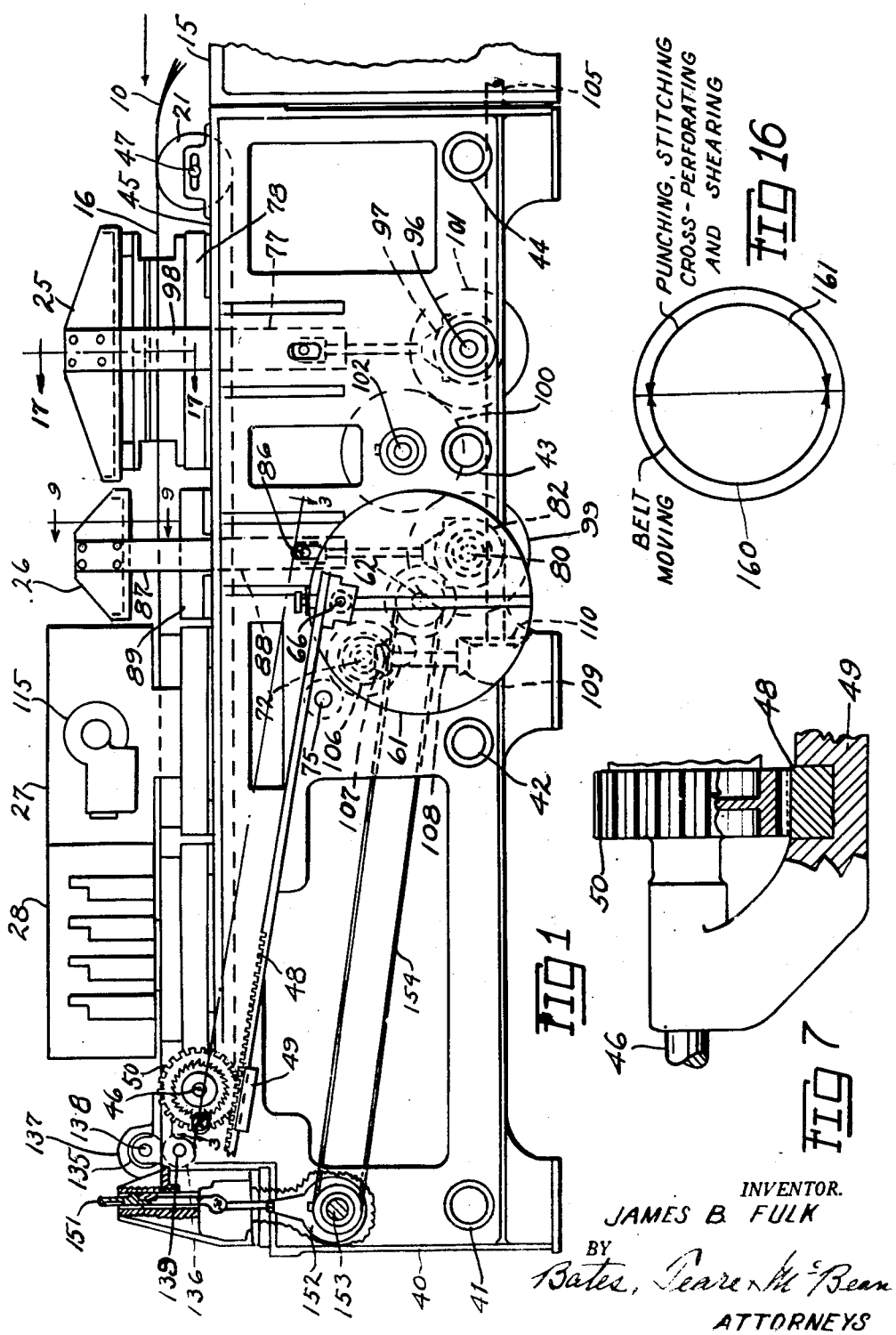

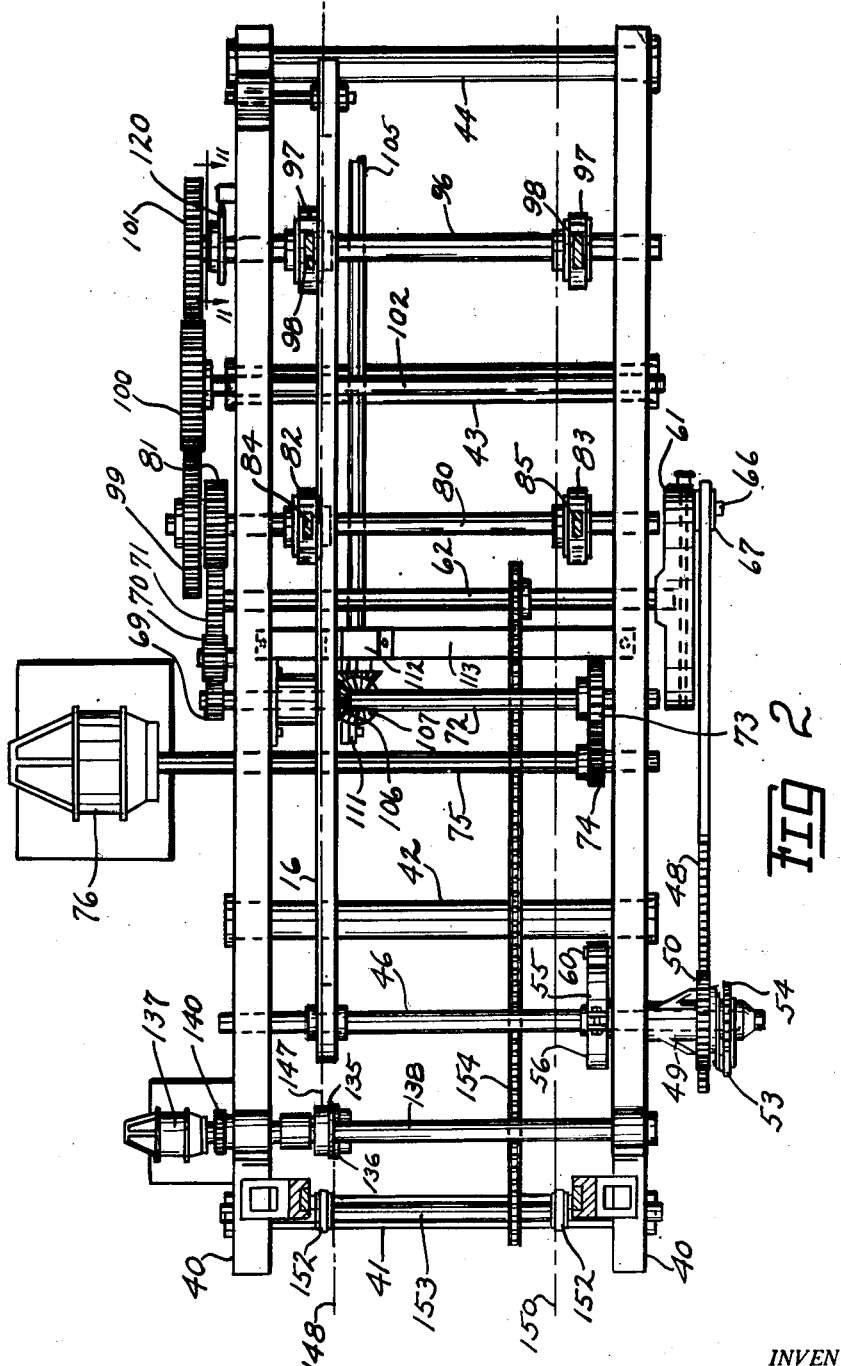

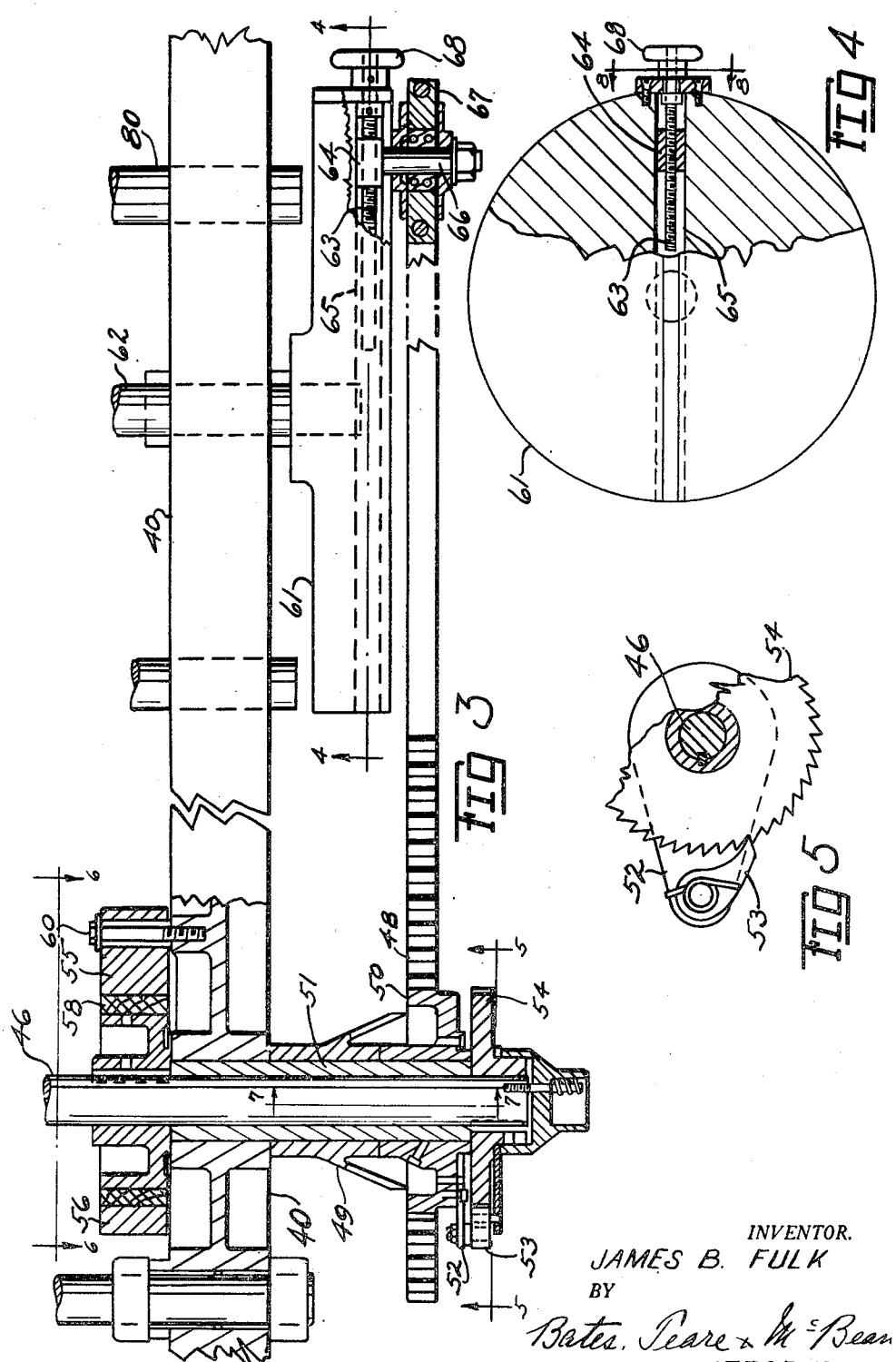

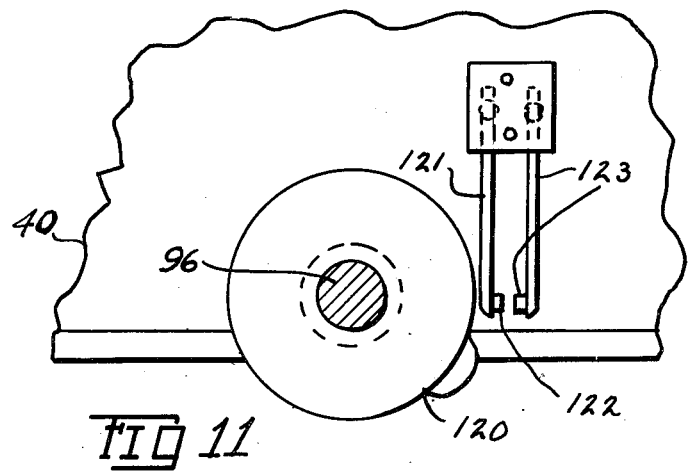
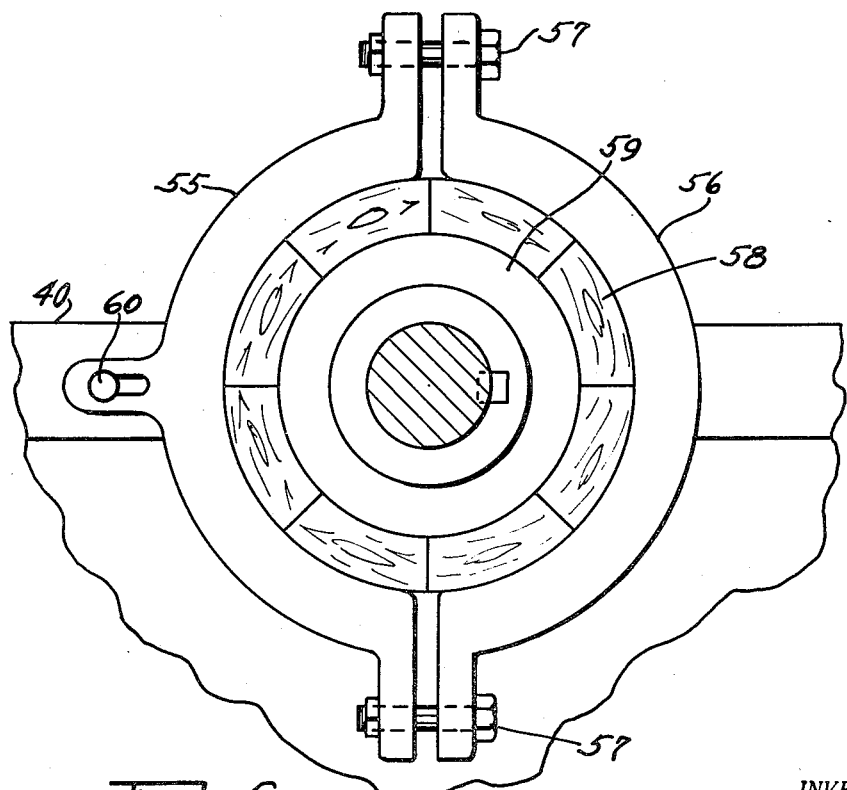

July 8, 1952  J. B. FULK  2,602,665
METHOD AND APPARATUS FOR MAKING MANIFOLD FORMS
Filed Nov. 2, 1948  6 Sheets-Sheet 5

INVENTOR.
JAMES B. FULK
BY
Bates, Teare & McBean
ATTORNEYS

July 8, 1952   J. B. FULK   2,602,665
METHOD AND APPARATUS FOR MAKING MANIFOLD FORMS
Filed Nov. 2, 1948   6 Sheets-Sheet 6
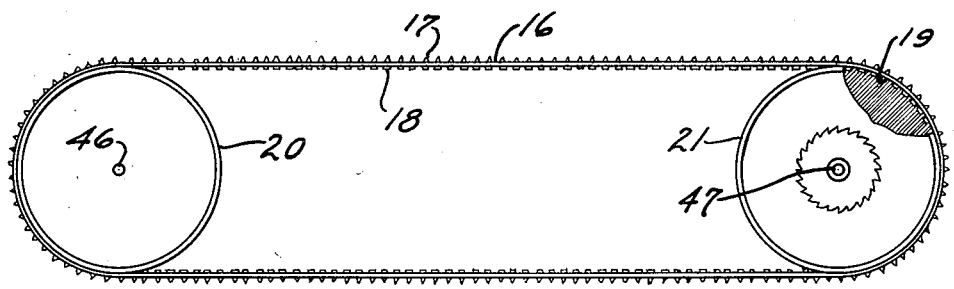
Fig 12
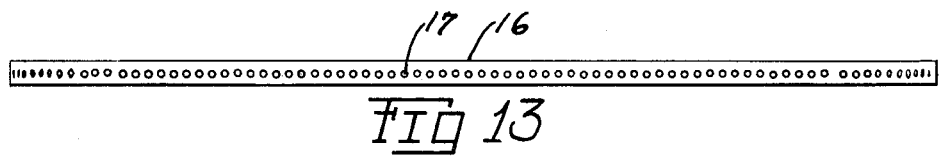
Fig 13
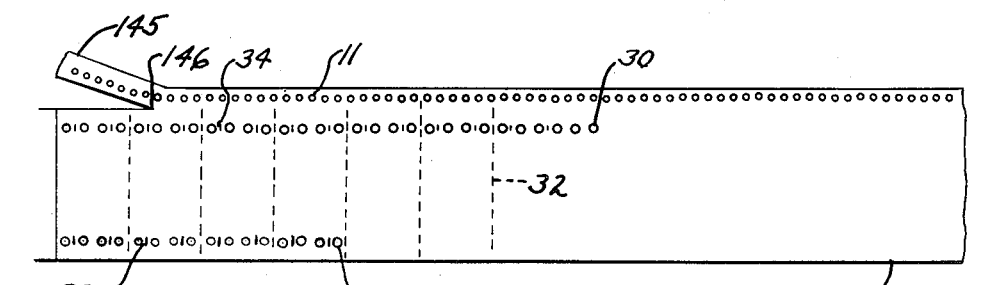
Fig 14
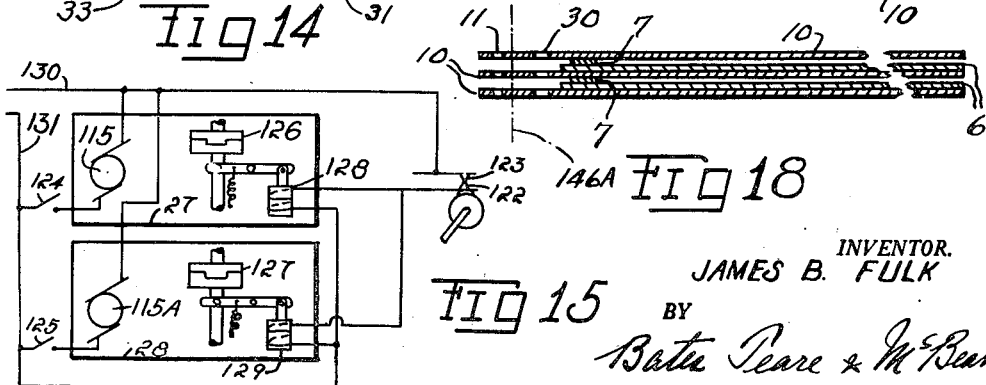
Fig 18
Fig 15
INVENTOR.
JAMES B. FULK
BY
Bates Peare & McBean
ATTORNEYS

Patented July 8, 1952

2,602,665

UNITED STATES PATENT OFFICE 2,602,665

METHOD AND APPARATUS FOR MAKING MANIFOLD FORMS

James B. Fulk, Green Bay, Wis., assignor of one-half to Fred Ross, Green Bay, Wis.

Application November 2, 1948, Serial No. 57,975

21 Claims. (Cl. 270—53)

This invention relates to a method and apparatus for making manifold forms in which one-time carbons are employed for making a record.

The invention is adapted for use in making forms that are suitable for use on tabulating machines or for making manifold packs. Usually such forms include two or more record sheets with interleaved transfer sheets that form a single unit, or are formed in long continuous webs that are folded in zig-zag formation.

Tabulating forms usually comprise a continuous strip of record and interleaved transfer material and frequently embody as many as ten or more record strips arranged in superimposed relationship. The distinctive feature of such forms is the utilization of a row of control holes along one or both edges of the product. The holes are intended for the reception of the pins on a tabulating machine attachment whereby the continuous strips or forms are fed automatically through the tabulating machine. Such control holes are usually spaced one-half inch or one inch apart and in some cases are punched through the record strips, as well as the transfer strips, or in some instances are punched through the record strip and transfer strip on one edge of the form but only through the record strip on the other edge of the form. Again, there are instances wherein the record and transfer strips are punched only along one edge, and there are instances wherein the record sheet only is punched along one edge. In the latter instance the carbon strips may be attached to the record strip by stapling or by pasting along a narrow line in close proximity to the control holes.

Heretofore, one method of manufacturing tabulating forms has been to punch the control holes on the printing press as the paper is being printed one strip at a time. The carbon is also punched and perforated separately, one strip at a time, whereupon the record and transfer strips are then gathered together and folded up into packs.

Experience has shown that it is most difficult to punch clean holes on a high speed rotary press and that as a result, a problem has been encountered in the movement of the forms in use over the tabulating machine. Experience has also shown that where the tabulating forms are cross-perforated when interleaved with transfer strips, the perforating blade has a tendency to distort the register, and that such distortion becomes progressive due to the fact that any pulling of the forms out of register by a slight increment at each perforation, results in cumulative misregistration.

A further problem which has been encountered in the pre-preparation of the carbon or transfer strips has been the difficulty in aligning the apertures therein with those in the printed record strips because of the fact that the punchings on the strips are made at different times and on different machines.

An object of the present invention is to obtain an accurate register of the control holes in tabulating forms between the record strips, and between the record and transfer strips, and to maintain a definite relationship between the holes and the printing on the record strips. An additional object is to perform other operations on the forms, such as cross-perforating and stapling in an expeditious manner. In this connection, the invention contemplates additionally the elimination of the pre-preparation of holes and cross perforations in the transfer strips, and additionally includes a method by means of which the forms may be manufactured with a high degree of accuracy.

I carry out the foregoing objects by eliminating the step of punching the control holes and cross perforating on the press, and by eliminating the pre-punching or pre-cross perforating of the transfer strips. Instead, I cause a row of holes to be made along at least one edge of the record strips in constant fixed relation to the printing while the strips are in the press, and for such purpose, I utilize a width of form in excess of that of the finished form. I then bring the record strips together with interleaved unperforated and unpunched carbon strips in a collating machine, such as that illustrated and described in United States Patent No. 2,100,776, issued November 30, 1937 on an invention by George L. Fulk. At such time, the transfer strips may be fastened, as by adhesive, to the record strips. After the strips are brought together in the collating machine, they are then caused to pass across one or more endless belts which have projections that engage the apertures in the record strips, whereby all of the superimposed strips are retained in accurate registration. The belt or belts are caused to be moved intermittently, and during the stationary intervals, the control holes are punched, and the cross perforating and stapling operations are performed, as a result of which all superimposed record strips and carbon strips have the control holes and cross perforations in absolute alignment with the printed matter on the forms. The arrangement is such that the punch and other work-performing mechanism are out of contact with the forms during the interval of movement of the forms and belt. I prefer to perform the punching and perforating operations within the confines of the ends of the belts. After the forms leave the belt the perforated strip along the edge is cut off and discarded.

Figure 8:
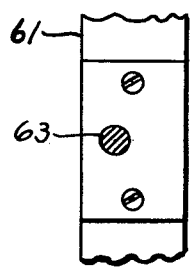
Figure 10:
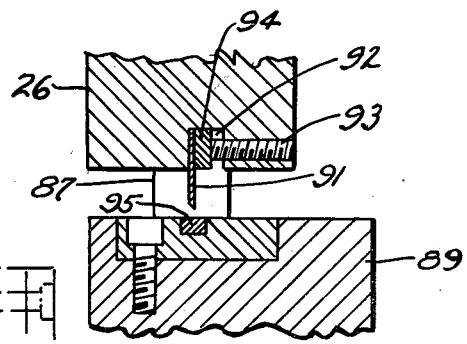
Figure 17:
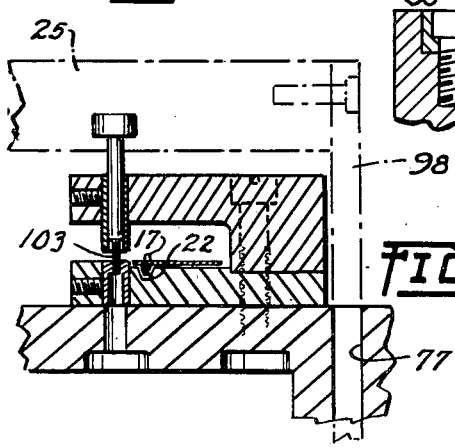

Referring now to the drawings, Fig. 1 is a side elevation, partly in section, of a machine embodying the present invention; Fig. 2 is a top plan view of the machine, but with the punching, perforating and stapling devices removed; Fig. 3 is a section taken on a plane indicated by the line 3—3 but showing the rack actuating crank advanced approximately 90° in a clockwise direction from that shown in Fig. 1; Figs. 4, 5, 6 and 7 are sections taken on planes indicated by the correspondingly numbered lines in Fig. 3; Fig. 8 is a section taken on a plane indicated by the line 8—8 in Fig. 4; Fig. 9 is a section taken on a plane indicated by the line 9—9 in Fig. 1; Fig. 10 is a section taken on a plane indicated by the line 10—10 in Fig. 9; Fig. 11 is a section taken on a plane indicated by the line 11—11 in Fig. 2; Fig. 12 is a side view of the belt which is utilized for engaging and advancing the forms through the machine; Fig 13 is a top plan view of the belt; Fig. 14 is a top plan view of the superimposed strips of forms; Fig. 15 is a wiring diagram for illustrating the operation of the stapling machine; Fig. 16 is a time-cycle diagram; Fig. 17 is a section taken on a plane indicated by the line 17—17 in Fig. 1, and Fig. 18 is a section taken through a set of assembled record and transfer strips.

The present invention is concerned with a method of making manifold forms after they have been assembled with interposed carbon strips by a collating machine such as that shown in United States Patent No. 2,100,766 aforesaid. Briefly, such machine operates to interpose transfer strips between record strips from rolls of record and transfer strips, after which the assembled strips, indicated at 10 in Fig. 1, are passed in the direction of the arrow onto the machine which is utilized for carrying out the present invention. The record strips in such instance are illustrated in Fig. 14 as having a row 11 of holes along one edge, or both edges, as desired, which are used as a guiding and feeding medium for the strips through the aforesaid collating machine. In Fig. 1 a portion of the end of the collating machine is indicated at 15.

The machine by means of which the present invention is carried out replaces the cut-off unit which is disposed at the delivery end of the machine illustrated in said Patent No. 2,100,776. According to the present invention, the superimposed record strips, with the interleaved transfer strips, are passed onto a strip feeding device which preferably comprises a narrow metallic belt 16 having studs 17 projecting therefrom at spaced regular intervals corresponding to the spacing of the perforations 11 in the record strip. The studs thus enter the openings 11 and act to guide and feed the forms as well as to hold them against any shifting movement during the punching, perforating or stapling operations. The studs are shown as having heads 18 on the underside of the belt which are adapted to enter pockets 19 in the wheels 20 and 21 respectively, whereby the belt is driven whenever the driving wheel 20 is rotated. While I have shown only one belt 16, it is to be understood that, if desired, I may utilize two belts, the second being disposed parallel to the first and adapted to engage the strips on the edge opposite to that engaged by the belt 16.

The belt 16 operates to move the forms beneath a punching device that is indicated in general at 25 in Fig. 1, then through a cross perforating device, indicated in general at 26, and then through stapling devices, one of which is indicated at 27 for inserting staples along one edge of the form and another of which is indicated at 28 for inserting staples along the other edge of the form. Thus, as may be seen in Fig. 14, the punching device 25 is adapted to punch the apertures 30 and 31 along one or both edges of the form, the perforator 26 is adapted to make the cross perforations indicated at 32, the stapling device 27 is adapted to insert the staples indicated at 33 and the stapling device 28 is adapted to insert the staples indicated at 34. The belt 16, together with the studs which engage the aligned record sheets, passes between the upper and lower working members of the punching, perforating and stapling mechanisms and is guided in its travel as by guideway 22 (Fig. 17). Thus the belt maintains a constant accurate relationship with the work performing members of those mechanisms, some of which are above the strips and some below the strips, so that the studs, which control the alignment and position of the printed strips, are at a minimum distance (laterally) from the working members. Moreover, the pins are in constant engagement with the registering apertures of the strips at about 1″ intervals while the strips are passing through the mechanisms, as well as during the stationary intervals when the control holes are being punched and the cross perforating and stapling operations are being performed.

The present invention includes a method of performing the punching and other operations upon the forms while they are securely held against movement and in registration with each other. Additionally, the invention provides mechanism by means of which the forms are advanced intermittently and by means of which the punching, stitching, cross perforating and shearing (if desired) may be accomplished while the forms are stationary. The mechanism for accomplishing such operation includes a frame 40 which embodies two similarly formed members that are adapted to be connected together by spacing bars indicated at 41, 42, 43 and 44, respectively. The top surfaces 45 of the frame members support the punching, perforating and stapling devices aforesaid and also support bearings for shafts 46 and 47 upon which the belt wheels 20 and 21 are respectively carried.

The belt driving shaft 46 may be rotated intermittently by means of a rack 48, one end of which is slidably mounted within a saddle 49 which is loosely positioned upon the shaft 46 and is adapted to operate a gear 50. The gear in turn is loosely mounted upon a sleeve 51 (Fig. 3) and has affixed thereto an arm 52 which carries a pawl 53. The pawl is adapted to actuate a ratchet wheel 54 which is shown as being affixed to the shaft 46. Thus, whenever the rack is moved to the left of the position shown in Fig. 1, the pawl idles on the ratchet wheel, whereas when the rack is moved to the right, the pawl actuates the ratchet to turn the shaft 46. During such idling movement, the shaft 46 is held against rotation by means of a braking device (Fig. 6) which may comprise two substantially semi-circular members 55 and 56 which are adapted to be held together by securing members 57, and which are adapted to exert pressure upon a liner 58 which is shown as comprising a plurality of segmental wooden blocks which engage a brake drum 59 that is fixed to the shaft 46. The housing member 55 may be fastened to the frame member 40 by securing member 60.

The rack may be reciprocated within the saddle by a crank 61 which is fixed to the shaft 62, and the throw of the crank arm may be adjusted radially by means of an adjusting screw 63 which engages a nut 64. The nut, in turn, is shiftable within a radial slot 65, as is best shown in Fig. 4. The outer end of the nut 64 terminates in a crank pin 66 which is carried in a bearing block 67, and the bearing block is fixed to one end of the rack bar. Thus, by rotating the hand wheel 68, the throw of the crank pin can be varied as a result of which the distance between the cross perforations 32 can be varied in accordance with the length of form desired.

Rotation of the crank shaft 62 may be effected through gears 69, 70 and 71 (Fig. 2) by an intermediate shaft 72 which is journalled in the frame members 40 and which carries a gear 73. The latter meshes with a gear 74 on a drive shaft 75, and the drive shaft is adapted to be operated by a motor 76.

To actuate the punching device and the cross perforator 25 and 26 respectively, I have shown a perforator drive shaft 80 which carries a gear 81 that is in mesh with gear 71. The shaft carries a pair of eccentrics 82, each of which has a connecting rod 84 connected thereto. Each rod is connected by a pin and slot connection 86 to a bar 87 which is mounted for vertical reciprocation within a guideway 88 that depends from the base 89 of the perforator head. The bars 87 carry the perforator pressure head 26, and the timing of the gearing is such that the head 26 is lowered to effect perforation of the forms while the belt 16 is in the stationary interval.

The perforator is shown in more detail in Figs. 9 and 10 wherein the head 26 is shown as being urged normally away from the base by a spring 90 which surrounds a pin 79 at each end of the head. The perforating blade is indicated at 91 as being mounted within a slot 92 and as being held in place by lock screws 93 which bear against a clamping block 94. The base plate carries a block 95 against which the perforating blade may exert pressure through the interposed forms.

The mechanism for operating the punch is similar to that for actuating the perforating device. To this end the punch actuating shaft is indicated at 96 as carrying a pair of eccentrics 97 which in turn actuate the bars 98 which carry the pressure head 25. The bars are mounted for vertical reciprocation within guideways 77 which depend from a base plate 78, which is fastened by any suitable means to the frame 40. The punch head may carry a plurality of punches, one of which is indicated at 103, in close proximity to the edge of the belt 16. The punch operating shaft 96 may be rotated by means of gears 99, 100 and 101 which are affixed to the perforating drive shaft 80 to the intermediate drive shaft 102 and to the punch shaft 96 respectively. The timing of the gearing is such as to actuate the punch head simultaneously with the perforating device, so as to perform operations on the form while the belt is stationary, and so as to clear the forms when the belt is moving.

The motor 76 may also be utilized for actuating a shaft 105, which extends to the collator 15 and which operates the mechanism thereon for gathering the forms from the rolls and delivering the strips in superimposed formation onto the belt 16. The shaft 105 may be rotated through a bevel gear 106 on the shaft 72, which meshes with bevel gear 107 on the vertical shaft 108. The lower end of the shaft 108 carries a bevel gear 109 which meshes with the bevel gear 110 on the shaft 105. The shaft 108 may be journalled in bearing 111 which is carried by one of the frame members 40, and the shaft 105 may be journalled in a bearing 112 which is positioned on a cross bar 113. The cross bar in turn is shown as being attached to the respective frame members 40.

The stapling devices 27 and 28 are each operated by an electric motor, one of which is indicated at 115 on the device 27, it being understood that a similar motor 115A is mounted on the device 28. These motors are adapted to rotate constantly and to be actuated to drive a staple into the forms, upon closing of the electric circuit through a solenoid to release a one revolution clutch. The closing of the circuit may be accomplished by means of a cam 120 which is fixed to the punch actuating shaft 96 and which is adapted to actuate the spring arm 121 to move the contact point 122 into engagement with the contact point 123.

As shown in Fig. 15, current from a source of supply may be obtained through conductors 130 and 131 and fed to the motors 115 and 115A on the devices indicated in general at 27 and 28 respectively. The motors may be controlled by master switches 124 and 125 respectively, and the devices are shown as having a one turn clutch 126 and 127 respectively. Each clutch is biased to open position but is adapted to be engaged upon operation of solenoids 128 and 129 respectively. The circuits through the solenoids are closed whenever the contact 122 engages the contact 123.

The forms which pass through the apparatus are, as aforesaid, wider than the finished forms, but the narrow strip containing the holes 11 is adapted to be severed from the forms by means of cutter wheels 135 and 136 which are constantly rotated by a motor 137. The cutters are disposed upon shafts 138 and 139 respectively and the shafts in turn are connected by gearing 140 to be in constant rotation. Thus, in Fig. 14, the narrow strip 145 is shown as being severed from the form at the point 146, while in Fig. 2, the outer line of one edge of the form, prior to severance is shown at 147, while at 148 the line is illustrated after severance. A line designating the opposite edge of the form is indicated at 150. Whenever the row of holes 11 is duplicated on the opposite edge of the forms, as aforesaid, relatively wide strips may be held with greater ease, in which case the trimming apparatus aforesaid is also duplicated.

If desired, the forms after having been punched, perforated and stapled may be withdrawn from the apparatus as long continuous strips and may be folded into packs in any suitable manner. On the other hand, the forms may be cut into any desired length by means of a vertically operating shear 151 which is adapted to be actuated by eccentrics 152 which are mounted upon a shaft 153. The shaft in turn may be driven by a chain 154 which extends over sprocket wheels on the shaft 153 and the shaft 62 respectively. The timing is such that the gear is operated to cut the forms while they are in the stationary position. Thus, Fig. 16 illustrates the timing cycle as represented by a complete circle wherein the portion 160 indicates the movement of the belt and the portion 161 indicates the time during which the punching, cross perforating, stapling and shearing occurs.

In Fig. 18 I have shown an assembly of record and transfer strips wherein the record strips 10 have interleaved transfer strips 6 which are adhesively connected together as indicated at 7. The holes 11 on the removable strips are indicated at one end of the record strips while the punched holes 30 are shown in close proximity thereto. The line 146-A indicates the location of the line of severance of the outer strips from the body of the record strips. It is to be understood, however, that the assembly may consist of a greater number of record and transfer strips and that the rows of holes 11 and 30 may be duplicated along the opposite edge of the strips as previously stated. By locating the belt projections 17 as close as possible to an edge of the belt, and by locating the punches as close as possible to the same edge of the belt, the punching is accomplished in a region where the strips are firmly supported and the resulting holes are cleanly and accurately made. Likewise, by applying the staples to the strips in a location closely adjacent to the inner edge of the belt, the forms are securely fastened together at a time when registration thereof is at the optimum condition.

An advantage of the present invention is the fact that the press which prints the forms may be operated at a high rate of speed and that the row or rows of holes 11 thereon need not be made with the high degree of cleanness as is necessary for the control openings 30 and 31 which appear in the final forms. Moreover, the control holes in the finished forms can be made with dies which have a straight up and down motion, with a resulting quality of punching that is not obtainable at the speed of a rotary press. Moreover, the present invention affects the punching, stitching and cross perforating, as well as shearing (if desired) while the forms are rigidly held in stationary position.

A further advantage is that the forms and carbon can be punched at the same time while all of the strips are under control. Moreover, imperfect alignment of the holes is eliminated because the forms are punched while they are held in an absolute straight line by the belt and because the punches are positioned in close proximity to the edge of the belt and within the confines of the ends of the belt. This also obviates the necessity for pre-punching of the control holes and pre-perforating of the transfer strips and greatly facilitates the manufacture of accurate tabulating forms.

I claim:

1. A method of making manifold forms having a plurality of record strips with a plurality of interleaved transfer strips comprising, providing a narrow strip, having a row of holes along at least one edge of the record strips as a guiding and feeding medium, establishing control boundaries against displacement within and normal to the plane of the strips, by passing the forms over a belt which has projections that are adapted to enter the holes in the strips, intermittently moving the belt with the associated forms under control thereon, performing an operation on the forms within the confines of the ends of the belt while they are stationary, continuously maintaining the control boundaries at and during the operation and then severing the narrow strip.

2. A method of making manifold forms having record strips with interleaved transfer strips comprising, providing a narrow strip having a row of holes along at least one edge of the record strips as a guiding and feeding medium, establishing control boundaries against displacement within and normal to the plane of the strips, by passing the forms over a belt which has projections that are adapted to enter the holes in said strips, punching a row of holes in the forms inwardly of said first row of holes and within the confines of the ends of the belt while they are held by the belt, continuously maintaining the control boundaries at and during the punching of the strips, and then removing the narrow strip.

3. A method of making manifold forms having record strips with interleaved transfer strips comprising, providing a narrow strip having a row of holes along at least one edge of the record strips as a guiding and feeding medium, establishing control boundaries against displacement within and normal to the plane of the strips, by passing the forms over a belt which has projections that are adapted to enter the holes in said strips, impressing cross perforations in the forms within the confines of the ends of the belt while they are held by the belt, continuously maintaining the control boundaries at and during the impression of cross-perforations, and then removing the narrow strip.

4. A method of making manifold forms having record strips with interleaved transfer strips comprising, providing a narrow strip having a row of holes along at least one edge of the record strips as a guiding and feeding medium, establishing control boundaries against displacement within and normal to the plane of the strips, by passing the forms over a belt which has projections that are adapted to enter the holes in said strips, intermittently moving the belt with the superimposed forms under control thereon, performing substantially simultaneously a plurality of operations upon the forms within the confines of the ends of the belt while they are held in stationary position upon the belt and continuously maintaining the control boundaries at each operation and throughout all operations on the strips.

5. A method of making manifold forms having record strips with interleaved transfer strips comprising, providing a narrow strip having a row of holes along at least one edge of the record strips as a guiding and feeding medium, establishing control boundaries against displacement within and normal to the plane of the strips, by passing the forms over a belt which has projections that are adapted to enter the holes in said strips, moving the belt intermittently a predetermined distance in regular sequence, and while the forms and belt are held stationary, performing substantially simultaneously and within the confines of the ends of the belt a punching, cross-perforating and stapling operation, withdrawing the punching, perforating and stapling mechanisms from the forms and holding them out of contact with the forms, advancing the belt a predetermined distance and then repeating the cycle of operations, and continuously maintaining the control boundaries at each operation and throughout the cycle of all operations.

6. A method of making manifold forms having record strips with interleaved transfer strips comprising, providing a narrow strip having a row of holes along at least one edge of the record strips as a guiding and feeding medium, establishing control boundaries against displacement within and normal to the plane of the strips, by passing the strips over a belt which has projections that are adapted to enter the holes in said strips, advancing the belt with an intermittent motion and punching one or more holes in the forms in close proximity to the belt while the forms are held in stationary position and continuously maintaining the control boundaries at and during the punching of the strips.

7. A method of making manifold forms having record strips with interleaved transfer strips comprising, providing a narrow strip having a row of holes along at least one edge of each record strip as a guiding and feeding medium, establishing control boundaries against displacement within and normal to the plane of the strips, by passing the strips over a belt which has projections that are adapted to enter the holes in said strips, punching one or more holes in at least the record strips in close proximity to an edge of the belt and within the confines of the ends of the belt, continuously maintaining the control boundaries at and during the punching of the strips and then severing the narrow strips.

8. A method of making manifold forms having record strips with interleaved transfer strips comprising, providing a narrow strip having a row of holes along at least one edge of each record strip as a guiding and feeding medium, establishing control boundaries against displacement within and normal to the plane of the strips, by passing the strips over a belt which has projections that are adapted to enter the holes in such strips, stapling all strips together in close proximity to the belt, and continuously maintaining the control boundaries at and during the stapling of the strips.

9. A method of making manifold forms which are suitable for use in a tabulating machine, comprising taking a plurality of record strips each having a row of holes along at least one edge thereof, interleaving said strips with transfer strips wherein the transfer strips are narrower than the record strips and have an uninterrupted surface, establishing control boundaries against displacement within and normal to the plane of the strips, by passing the interleaved record and transfer strips over a belt which has projections that are adapted to enter the holes in said record strips, and holding the interleaved record and transfer strips under control upon the belt while performing an operation on the record and transfer strips within the confines of the ends of the belt.

10. A method of making manifold forms embodying interleaved record and transfer strips, comprising taking a plurality of record strips each having a row of holes along at least one edge but outside the confines of the width of the finished forms, interleaving said record strips with transfer strips which are narrower than the record strips and which have an uninterrupted surface, establishing control boundaries against displacement within and normal to the plane of the strips, by passing the interleaved record and transfer strips over a belt which has projections that are adapted to enter the holes in said record strips, punching a row of form-feeding and register controlling holes along an edge of at least the record strips, but outside the transfer strips, continuously maintaining the control boundaries at and during the punching of the strips, and then removing the strip containing the row of holes outside the confines of the width of the finished form.

11. A method of making manifold forms, comprising taking a plurality of record strips each having a row of holes along at least one edge but outside the confines of the width of the finished forms, interleaving said record strips with transfer strips which have an uninterrupted surface, establishing control boundaries against displacement within and normal to the plane of the strip, by passing the interleaved record and transfer strips over a belt which has projections that are adapted to enter the holes in said record strips, punching a row of form-feeding and register controlling holes along opposite edges of the record strips with one of the rows being closely adjacent to the edge of the belt, continuously maintaining the control boundaries at and during the punching of the strips and then removing the strip containing the row of holes outside the confines of the width of the finished form.

12. A method of making manifold forms, embodying interleaved record and transfer strips, comprising taking a plurality of record strips each having a row of holes along at least one edge but outside the confines of the width of the finished form, interleaving said record strips with transfer strips which have an uninterrupted surface, passing the interleaved record and transfer strips over a belt which has projections that are adapted to enter the holes in said record strips, holding the interleaved record and transfer strips upon the belt and stapling them together adjacent to an edge of the belt and within the confines of the normal width of the finished form.

13. A machine for performing an operation on a plurality of superimposed interleaved record and transfer strips, said record strips having a succession of form lengths thereon and having a plurality of regularly spaced openings throughout their length, a belt having control projections extending therefrom at regularly spaced intervals and that are adapted to engage the openings in said record strips so as to maintain the corresponding form lengths on respective superimposed record strips in registration, means for moving the belt intermittently a distance corresponding to the spacing between operations periodically performed thereon, means located within the strip engaging portion of the belt for punching a row of holes in the strips inwardly of the first row of openings and within each form length while they are held in stationary position by the belt within the confines of the ends of the belt, and means for severing a narrow portion of the record strips containing the openings at the completion of the punching operation.

14. A machine for performing an operation on a plurality of superimposed interleaved record and transfer strips, said record strips having a succession of form lengths thereon and having a plurality of regularly spaced openings throughout their length, a belt having control projections extending therefrom at regularly spaced intervals and that are adapted to engage the openings in said record strips so as to maintain the corresponding form lengths on respective superimposed record strips in registration, means for moving the belt intermittently a distance corresponding to successive form lengths, means located within the strip engaging portion of the belt for cross-perforating the strips at form length intervals while they are held in stationary position by the belt within the confines of the ends of the belt, and means for severing narrow portions of the record strips containing the openings at the completion of the cross-perforating operation.

15. A machine for performing an operation on a plurality of superimposed interleaved record and transfer strips, said record strips having a succession of form lengths thereon and having a plurality of regularly spaced openings throughout their length, a belt having control projections extending therefrom at regularly spaced intervals and that are adapted to engage the openings in said record strips to maintain the corresponding form lengths on respective superimposed record strips in registration, means for moving the belt intermittently a distance corresponding to the spacing between periodic operations performed thereon, means located within the strip engaging portion of the belt for stapling the strips at spaced intervals while they are held in stationary position by the belt within the confines of the ends of the belt.

16. A machine for performing an operation upon a plurality of superimposed interleaved record and transfer strips, said record strips having a succession of form lengths thereon and having a plurality of regularly spaced openings throughout their length, a belt having control projections extending therefrom at regularly spaced intervals and that are adapted to engage the openings in said record strips so as to maintain the corresponding form lengths on respective superimposed record strips in registration, means for moving the belt intermittently a distance corresponding to the spacing between periodic operations performed thereon, means located within the strip engaging portion of the belt for punching holes in the strips within each form length and for cross-perforating the strips at form length intervals while the belt is stationary, said punching means being disposed in close proximity to one edge of the belt, and means for severing narrow portions of the record strips containing the openings at the completion of the punching and perforating operations.

17. A machine for performing an operation on a plurality of superimposed interleaved record and transfer strips, said record strips having a succession of form lengths thereon and having a plurality of regularly spaced openings throughout their length, a belt having control projections extending therefrom at regularly spaced intervals and that are adapted to engage the openings in said record strips so as to maintain the corresponding form lengths on respective superimposed record strips in registration, means for moving the belt intermittently a distance corresponding to the spacing between periodic operations performed thereon while the strips are so engaged, means located within the strip engaging portion of the belt for stapling the strips together at spaced intervals while the strips are held in stationary position by the belt, said stapling means being disposed in close proximity to one edge of the belt, and means for severing narrow portions of the record strips containing the openings at the completion of the stapling operation.

18. A machine for performing operations upon a plurality of superimposed interleaved record and transfer strips, said strips having a succession of form lengths thereon and having a plurality of regularly spaced openings throughout their length, a belt having control projections extending therefrom at regularly spaced intervals and that are adapted to engage the openings in said record strips so as to maintain the corresponding form lengths on respective superimposed record strips in registration, means for moving the belt intermittently a distance corresponding to the spacing between periodic operations performed thereon, means for punching holes in the strips within each form length, means for cross-perforating the strips at each form length, means for stapling the strips at spaced intervals, each of said means located within the strip engaging portion of the belt and ecah being operative substantially simultaneously while the strips are held in stationary position by the belt and means for severing narrow portions of the record strips containing the openings at the completion of the punching, perforating, and stapling operations.

19. A machine for performing operations upon a plurality of superimposed interleaved record and transfer strips, said record strips having a succession of form lengths thereon and having a plurality of regularly spaced openings throughout their length, a belt having regularly spaced control projections extending therefrom and that are adapted to engage the openings in said record strips so as to maintain the corresponding form lengths on respective superimposed record strips in registration, mechanism including ratchet and pawl means for advancing the belt intermittently a distance corresponding to the spacing between periodic operations performed thereon while the strips are so engaged, other mechanism operating within the strip engaging portion of the belt when the strips are stationary for punching, cross-perforating, and stitching the strips together simultaneously in predetermined relation to each other and to the form lengths thereon, said last named mechanism operating to clear the strips before the strips are advanced, the first mentioned mechanism including also a crank and electric motor for rotating the crank, and means for adjusting the throw of the crank so as to vary the extent of movement of the belt.

20. A machine for performing operations on a plurality of superimposed interleaved record and transfer strips, said record strips having a succession of form lengths thereon and having a plurality of regularly spaced openings throughout the length of the strips, a belt having control projections extending therefrom at regularly spaced intervals and that are adapted to engage the openings in said record strips to maintain the corresponding form lengths on respective superimposed record strips in registration, means for moving the belt intermittently a distance corresponding to the spacing between periodic operations performed thereon while the strips are so engaged, a braking device operating to hold the belt stationary, mechanism including a coacting crank, rack, gear, pawl and ratchet for effecting intermittent operation of the belt, means for rotating the crank and means for imparting work performing operations within the strip engaging portion of the belt in predetermined relation to the form lengths on the strips while they are held in stationary position by the belt.

21. A machine for performing an operation upon a plurality of superimposed interleaved record and transfer strips, said record strips having a plurality of regularly spaced openings throughout their length and having a succession of form lengths thereon, a belt having control projections extending therefrom at regularly spaced intervals and adapted to engage the openings in the record strips to maintain the corresponding form lengths on the respective superimposed record strips in registration, mechanism for moving the belt at regular intervals corresponding to periodic operations performed thereon, means located within the strip engaging portion of the belt and acting upon the strips within the confines of the ends of the belt for stapling them together at spaced intervals while the belt holds them stationary, and other means operating when the forms are in stationary position for shearing them in predetermined form length.

JAMES B. FULK.

REFERENCES CITED

The following references are of record in the file of this patent:

UNITED STATES PATENTS

| Number | Name | Date |
|---|---|---|
| 352,123 | Getchell | Nov. 9, 1886 |
| 444,412 | Lietze | Jan. 6, 1891 |
| 2,020,734 | Nichols | Nov. 12, 1935 |
| 2,148,586 | Scudds | Feb. 28, 1939 |
| 2,150,016 | Wood | Mar. 7, 1939 |
| 2,154,157 | Fulk | Apr. 11, 1939 |
| 2,172,913 | Rose | Sept. 12, 1939 |
| 2,213,123 | Guilbert | Aug. 27, 1940 |
| 2,258,799 | Payne | Oct. 14, 1941 |
| 2,465,267 | Ritzert | Mar. 22, 1949 |